United States Patent Office 3,213,300
Patented Oct. 19, 1965

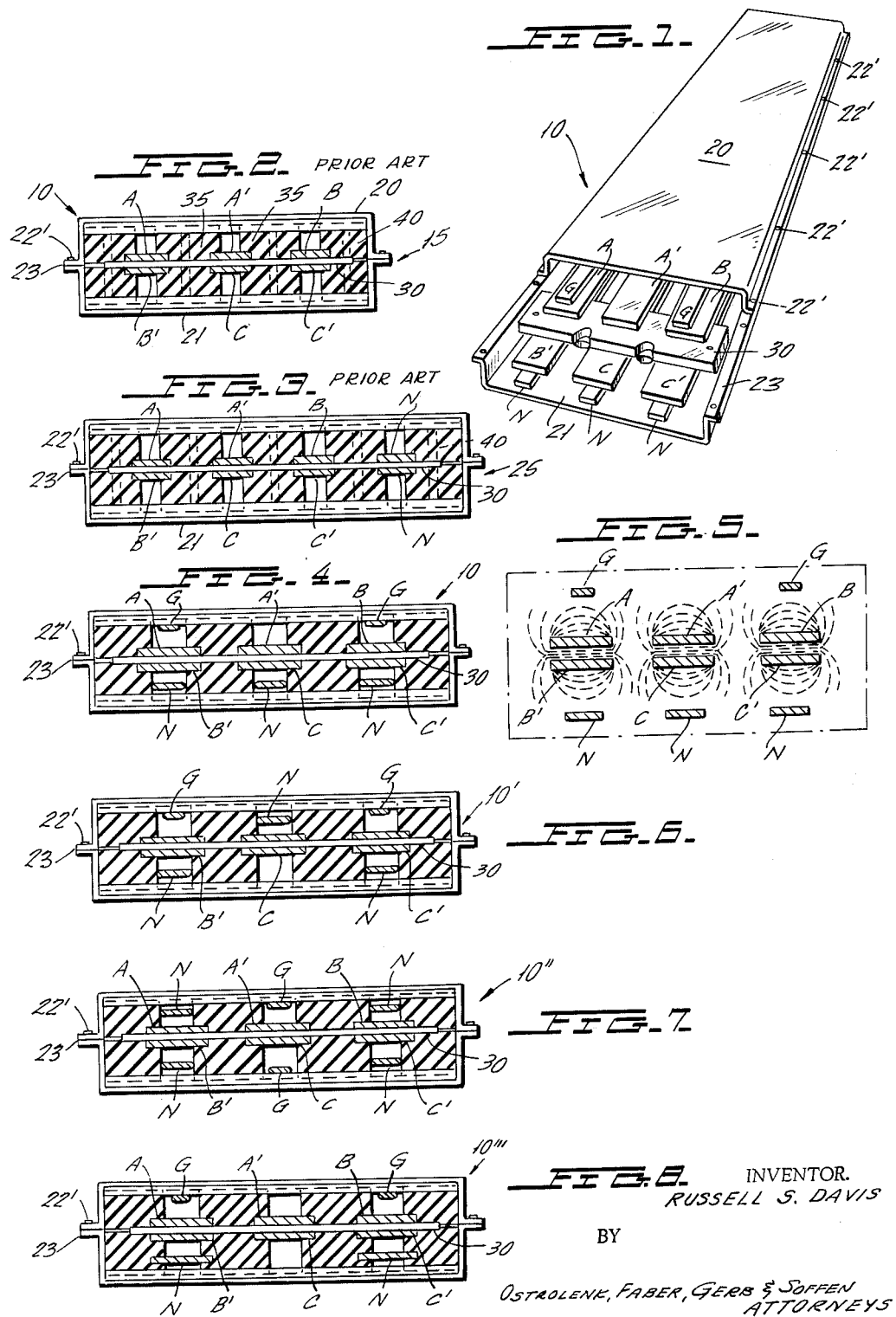

3,213,300
LOCATION OF NEUTRAL AND GROUND BUS BAR
IN LOW REACTANCE BUS DUCT ASSEMBLY
Russell S. Davis, Detroit, Mich., assignor to I-T-E Circuit
Breaker Company, Philadelphia, Pa., a corporation of
Pennsylvania
Filed July 1, 1963, Ser. No. 291,870
8 Claims. (Cl. 307—147)

My invention relates to an improved positioning arrangement for locating the neutral and/or ground bus of a multi-phase bus duct arrangement of the low reactance type. More particularly, I locate the neutral and/or ground bus within the bus duct housing and in close proximity to the main phase bus members to provide low reactance from phase to neutral and/or from phase to ground. Advantageously, these additional bus members are located at regions of low magnetic field established by the main phase bus.

A bus duct arrangement for multi-phase electrical distribution systems has been shown in U.S. Patent No. 2,287,502 to A. A. Togesen et al., wherein a pair of conductors are provided for each phase, and each bus or conductor is then placed in a close-spaced relationship with respect to another bus which, because of the geometric arrangement of the buses, carries a current which is displaced in phase by substantially 180° with respect to the first bus current. This relationship of the individual phase buses advantageously provides a compact low reactance system.

In addition to the main phase bus, many systems also necessitate the inclusion of neutral and/or ground bus. It has heretofore been the practice of locating these additional bus members away from the main phase bus bars, with such positioning being typically external to the bus duct housing or within a region of the bus duct housing remotely positioned with respect to the main phase bus bars. This arrangement disadvantageously provides a substantial reactance from phase to neutral, or from phase to ground, thereby delaying the operation of the distribution system protective devices in the event of unbalance or ground faults.

It has also been proposed to locate these additional bus members intermediate the main phase bus. This arrangement disadvantageously subjects these bus members to strong fields to the main phase bus, resulting in the inducing of appreciable E.M.F.'s in the neutral and/or ground bus.

My invention advantageously locates the neutral and/or ground bus within the bus duct housing, and in close proximity to the main phase bus, to thereby provide a low reactance circuit from phase to neutral and from phase to ground. Accordingly, the occurrence of an unbalance or ground fault condition will result in a higher fault current than heretofore provided, thereby lessening the response time of the associated protective devices.

As a particularly advantageous aspect of my invention, the improved location of the neutral and/or ground bus within the bust duct housing is accomplished without necessitating an increase in the external dimensions of the housing, thereby providing maximum versatility with respect to existing distribution equipment.

The low reactance bus duct arrangement of which my invention constitutes a modification thereof is of the type shown in the above-mentioned U.S. Patent No. 2,287,502 wherein each phase includes a pair of relatively flat buses, positioned in opposed coplanar relationship across an intermediate region of the volume enclosed by the bus duct housing, and geometrically arranged to combinedly provide a very low reactance system. In accordance with my invention, the neutral and ground bus bars are similarly positioned in intermediate planes located between the phase bus and the unit housing, with such neutral and/or ground bus being parallel and opposite to the main phase bus bars. Further the neutral and ground bus members are advantageously located at regions of low magnetic field, thereby avoiding the disadvantages of the prior arrangement wherein these bus members are located in the central region of the housing intermediate the planes of the main phase bus.

Alternative arrangements are shown of locating the neutral and/or ground bus bars, in accordance with the basic principle of my invention; the particular arrangement selected being determined by individual system requirements. Thus, in addition to locating the phase bus bars in the preferable geometric arrangement for providing a low reactance system, I advantageously position the neutral and ground bus bars within the same housing to also afford low reactance from phase to neutral and/or phase to ground.

Accordingly, a primary object of my invention is to provide a novel neutral bus location in a low reactance bus duct unit.

Another object of my invention is to provide a novel ground bus arrangement in a low reactance bus duct unit.

An additional object of my invention is to locate both the neutral and ground buses within the housing enclosure of a low reactance bus duct unit, in close proximity to the main phase bus, and in regions of low magnetic field to thereby provide low reactance from phase to neutral and phase to ground.

Still a further object of my invention is to locate the neutral and/or ground bus bars of a low reactance bus duct unit within the unit housing, in spaced-apart parallel arrangement with respect to the main phase bus.

Yet another object of my invention is to locate the neutral and ground bus bar members within the housing of a low reactance bus duct unit, having main phase bus bars positioned in opposed coplanar relationship, wherein the neutral and ground bus bars are parallel arranged in spaced-apart opposed relationship with respect to the main phase bus bars.

These as well as other objects of my invention will readily become apparent upon a consideration of the following drawings in which:

FIGURE 1 shows a perspective view of a bus duct unit constructed in accordance with one embodiment of my invention.

FIGURE 2 is a cross-sectional view of a prior low reactance type bus duct unit.

FIGURE 3 is a similar cross-sectional view showing the prior art arrangement with the addition of a neutral bus bar assembly within the housing enclosure, but remote from the main phase bus.

FIGURE 4 is a cross-sectional view of the bus bar structure shown in FIGURE 1, and illustrating one arrangement of the ground and neutral bus bars according to the teachings of my invention.

FIGURE 5 shows the magnetic field distribution of FIGURE 4, showing the preferable location of the ground and neutral bus in regions of low magnetic field.

FIGURES 6–8 show various other arrangements for locating the ground and neutral bus bars in accordance with the preferred manner of my invention.

Referring initially to FIGURE 1, it is seen that the three-phase bus duct unit 10 is comprised of a network of six bus bars A, A'; B, B'; C, C'; wherein bus bars A and A', B and B' and C and C' are energized from a first, second and third phase respectively. In accordance with the manner fully discussed in above-mentioned U.S. Patent No. 2,287,502, the individual bus bar members of the various phases are respectively positioned in close-spaced opposed coplanar relationship to one another so as to offer a compact, very low reactance system. In accordance with my invention, the addition of neutral bus bars N and ground bus bars G is provided within bus duct assembly 10, in the manner to be more fully discussed below, to provide very low reactance between the main phase bus, the neutral and/or ground bus.

The above-noted bus bars of FIGURE 1 may be supported in any desired manner from the bus duct housing, which is comprised of duct halves 20 and 21. These halves are seen to have flanged ends 22 and 23 respectively, which flanges allow a connection between the two duct halves 20 and 21 by means of the bolt arrangement, such as the bolts 22', which interconnect the flanges 22 and 23. It is further seen that the duct halves 20 and 21 are positioned with respect to one another to provide a scarf lap-joint upon connection to another bus duct unit, which is constructed in an identical manner.

Reference is now made to FIGURE 2, which shows a prior art three-phase, three-wire low reactance bus duct unit 15, without the inclusion of the ground or neutral bus; it being understood that the particular arrangement therein is one of the various arrangements in accordance with aforementioned U.S. Patent No. 2,287,502. The individual bus members A, A'; B, B'; and C, C' have a relatively flat cross-section, with bus bars A, A', B being located in a first plane, and bus bars B', C, C' being located in a second plane, with said planes being in opposed parallel relationship separated by ebony spacer means 30. Porcelain support members 35 are shown supporting the individual bus bar members in their respective positions, with bolts 40 maintaining the unit in its assembled position. It is to be noted that the addition of a ground or neutral bus (not shown) external to the unit 15 will establish substantial reactance between the main phase bus members and such a ground or neutral bus, particularly with the metal housing being located between the phase bus and such neutral or ground bus.

FIGURE 3 shows a prior art modification of the three-phase three-wire bus duct assembly shown in FIGURE 2, with the addition of neutral bus bars N located as shown. The bus duct unit 25 disadvantageously requires extending the width of the bus duct housing and fails to locate the neutral bars in close proximity to the main phase conductor members. Accordingly, although solving somewhat the problem of providing a four wire three-phase system within a bus duct housing, the arrangement shown in FIGURE 3 disadvantageously fails to provide low reactance between the main phase bus and the neutral bus, and necessitates an increase in the external dimension of the bus duct.

Reference is now made to FIGURES 4 and 5, which show the addition of both ground bus members G and neutral bus members N within the housing of assembly 10 and located in accordance with the preferable manner of my invention. Neutral bus members N are preferably of substantially flat cross-sectional area, and are coplanarly positioned along the lower region of the bus duct housing in a plane intermediate the plane of the main phase bus members B, C, C' and the external housing of the bus duct assembly 10. Similarly, ground bus members G are shown coplanarly positioned in the top region of the bus duct housing intermediate the plane of main phase bus members A, A', B and the housing enclosure.

The dotted line of FIGURE 5 illustrates the magnetic flux field distribution of the low reactance system, wherein the flux is seen to be of greatest concentration intermediate the planes of the main phase bus members. Accordingly, the previously proposed placement of the neutral and/or ground bus in that region will disadvantageously result in appreciable E.M.F.'s being induced therein. In contradistinction therewith, I advantageously locate neutral bus members N and ground bus members G in regions of low magnetic field, with such spacing being in the order of 1¾" to 2" from the main phase bus.

Hence, by so placing the neutral and ground bus members inside the housing of bus duct assembly 10 and parallel and opposite to the main phase bus bars, I advantageously provide low reactance between phase and ground and phase and neutral in an improved and compact manner.

It is naturally understood that although FIGURES 4 and 5 show the inclusion of both neutral and ground bus, the basic objectives of my invention provide for the inclusion of either neutral or ground, according to the particular system requirements.

FIGURES 6–8 show various other bus duct units 10', 10" and 10''' having other locations of the ground and neutral bus pursuant to the basic teachings of my invention; the particular arrangement selected for an application being determined by the main, neutral and ground bus requirements of the distribution system.

In the bus duct unit 10' of FIGURE 6, the neutral bus bars N are alternately positioned parallel and opposite main bus members A', B', C', of each of the phases, with the ground bus members G being positioned parallel and opposite to main phase bus members A, B.

FIGURE 7 shows an alternate arrangement wherein the neutral bus bars N are positioned at the end portions of the bus duct unit 10' parallel and opposite to main phase bus bars A, B', B, C', the ground bus bar members G being intermediately located parallel and opposite main phase bus bars A', C'. The neutral and ground bus bar members are located across the width of the unit intermediate the respective planes containing the main phase bus bars and the external housing.

FIGURE 8 shows an arrangement wherein the neutral bus bar members are coplanarly located at the upper region of the bus duct assembly 10''' parallel and opposite main phase bus bars B', C', with the plane thereof being located intermediate the plane of phase bus B', C, C' and the lower surface of the housing. The ground bus bar members G are similarly located at the upper region of the bus duct assembly parallel and opposite to the main phase bus bar members A, B, with the plane thereof being located intermediate the plane of phase bus A, A', B and the upper surface of the housing.

It is therefore seen that my invention provides a variety of arrangements wherein the neutral and/or ground bus bar members may be located in close proximity to the main phase bus bars of a low reactance type of bus duct assembly, thereby providing low reactance from phase to neutral and/or phase to ground.

Although I have described preferred embodiments of my novel invention, many variations and modifications will now be obvious to those skilled in the art, and I prefer therefore to be limited not by the specific disclosure herein but only by the appended claims.

The embodiments of the invention in which an exclusive privilege or property is claimed are defined as follows:

1. A bus duct assembly for an electrical system having at least three phases comprising an elongated housing; a first and second phase bus for each phase positioned within said housing; each of said phase buses having a relatively flat cross-section and being positioned with half of said phase buses on one side and the remaining half of said phase buses on the other side of a plane extending generally parallel to the faces of said phase buses; insulating means positioning said phase buses with respect to one another to provide a low reactance system; an additional bus; said additional bus positioned within said housing in a region of low magnetic field established by said phase buses, in close proximity to at least one of said phase buses and more remote from said plane than any of said phase buses to provide low reactance from phase to ground.

2. A bus duct assembly as set forth in claim 1 in which each of said phase bus bars on said one side are aligned in face to face relationship with a phase bus bar on said other side; said additional bus including at least one section positioned in alignment with the one of said phase buses closest thereto.

3. A bus duct assembly as set forth in claim 1 in which each of said phase bus bars on said one side are aligned in face to face relationship with a phase bus bar on said other side; said additional bus including a plurality of parallel sections; each of said sections positioned between a different one of said phase buses and said housing in alignment with the different one of said phase buses closest thereto.

4. A bus duct assembly as set forth in claim 3 in which said plurality of parallel sections are at least three in number.

5. A bus duct assembly as set forth in claim 3 in which some of said plurality of parallel sections are positioned on said one side and the remaining of said plurality of parallel sections are positioned on said other side.

6. A bus duct assembly as set forth in claim 3 in which there is an individual one of said parallel sections for each of said phase bus bars.

7. A bus duct assembly as set forth in claim 3 in which each of the parallel sections includes an elongated flat bar.

8. A bus duct assembly as set forth in claim 3 in which some of said parallel sections are grounded and the remaining parallel sections are neutral.

References Cited by the Examiner
UNITED STATES PATENTS

| | | | |
|---|---|---|---|
| 2,955,147 | 10/60 | Carlson | 174—68 |
| 3,044,036 | 7/62 | Herrmann | 174—99 X |

JOHN F. BURNS, *Primary Examiner.*

DARRELL L. CLAY, *Examiner.*